United States Patent
Liang et al.

(10) Patent No.: US 11,617,485 B2
(45) Date of Patent: Apr. 4, 2023

(54) CLEANING ROBOT

(71) Applicant: SHENZHEN SILVER STAR INTELLIGENT GROUP CO., LTD., Shenzhen (CN)

(72) Inventors: Feidu Liang, Shenzhen (CN); Zhongyan Shu, Shenzhen (CN); Changtai Xia, Shenzhen (CN); Ruijun Yan, Shenzhen (CN)

(73) Assignee: SHENZHEN SILVER STAR INTELLIGENT TECHNOLOGY CO., LTD., Shenzhen (CN)

( * ) Notice: Subject to any disclaimer, the term of this patent is extended or adjusted under 35 U.S.C. 154(b) by 397 days.

(21) Appl. No.: 16/942,831

(22) Filed: Jul. 30, 2020

(65) Prior Publication Data
US 2021/0161348 A1 Jun. 3, 2021

(30) Foreign Application Priority Data
Nov. 29, 2019 (CN) .......................... 201911205474.9

(51) Int. Cl.
*A47L 9/06* (2006.01)
*A47L 9/14* (2006.01)
(Continued)

(52) U.S. Cl.
CPC ............ *A47L 11/28* (2013.01); *A47L 11/4041* (2013.01); *A47L 11/4052* (2013.01);
(Continued)

(58) Field of Classification Search
CPC ........ A47L 9/1409; A47L 11/28; A47L 11/40; A47L 11/4036; A47L 11/4041;
(Continued)

(56) References Cited

U.S. PATENT DOCUMENTS 8,898,844 B1 12/2014 Dooley et al.
9,265,396 B1 * 2/2016 Lu ............................ A47L 13/16
(Continued)

FOREIGN PATENT DOCUMENTS

CN 107243464 A * 10/2017 ............. A47L 13/22
CN 108478121 A * 9/2018 ............. A47L 11/24
(Continued)

OTHER PUBLICATIONS

English translation of German Patent DE-102017116676-A1 (Year: 2019).*
(Continued)

*Primary Examiner* — Don M Anderson
*Assistant Examiner* — Ian James Geiger
(74) *Attorney, Agent, or Firm* — IPro, PLLC (57) ABSTRACT

A cleaning robot includes a main body, a drive assembly and a cleaning assembly. The main body includes a bottom part. The cleaning assembly includes a mounting part, a wiping part and a release part. The mounting part is positioned on the bottom part. The mounting part includes a first rail, a second rail, and a first positioning part. The wiping part is positioned on the mounting part and includes a second positioning part, the wiping part is movable from first ends of the first rail and the second rail to second ends thereof until the second positioning part abuts against the first positioning part whereby the wiping part is fixed on the mounting part. The release part is positioned on the mounting part and configured to separate the second positioning part from the first positioning part whereby the wiping part is detached from the mounting part.

19 Claims, 7 Drawing Sheets

(51) Int. Cl.
*A47L 13/16* (2006.01)
*A47L 9/04* (2006.01)
*A47L 11/40* (2006.01)
*A47L 11/28* (2006.01)
*B25J 11/00* (2006.01)
*A47L 13/254* (2006.01)
*A47L 13/44* (2006.01)

(52) U.S. Cl.
CPC .......... *A47L 11/4069* (2013.01); *A47L 13/254* (2013.01); *A47L 13/44* (2013.01); *B25J 11/0085* (2013.01); *A47L 2201/00* (2013.01)

(58) Field of Classification Search
CPC ............ A47L 11/4052; A47L 11/4069; A47L 11/4094; A47L 13/20; A47L 13/16; A47L 13/24; A47L 13/254; A47L 13/256; A47L 13/44; A47L 13/42; A47L 2201/00; A47L 13/21; A47L 13/22; A47L 13/23; A47L 13/25; A47L 13/26; B25J 11/0085; A47K 11/10
USPC .... 15/210.1, 209.1, 228, 98, 231, 97.1, 118, 15/49.1, 147.1, 151, 152, 176.4, 176.5, 15/176.6
See application file for complete search history.

(56) References Cited

U.S. PATENT DOCUMENTS

| | | | |
|---|---|---|---|
| 11,109,730 B2* | 9/2021 | Li | A47L 11/4088 |
| 2017/0055798 A1* | 3/2017 | Garrett | B05B 11/0005 |
| 2018/0344117 A1* | 12/2018 | Williams | A47L 11/4088 |
| 2021/0030236 A1* | 2/2021 | Jang | A47L 11/293 |

FOREIGN PATENT DOCUMENTS

| | | | | |
|---|---|---|---|---|
| CN | 208659179 U | | 3/2019 | |
| CN | 208988721 U | | 6/2019 | |
| CN | 110279351 A | | 9/2019 | |
| CN | 110448234 A | | 11/2019 | |
| DE | 102017116676 A1 | * | 1/2019 | ............ A47L 11/06 |
| KR | 20120006901 U | * | 10/2012 | ............ A47L 11/28 |

OTHER PUBLICATIONS

English Translation of CN 108478121 A (Year: 2018).*
English Translation of KR 20120006901 U (Year: 2012).*

* cited by examiner

CLEANING ROBOT

CROSS-REFERENCE TO RELATED APPLICATIONS

The present disclosure claims priority of Chinese Patent Application No. 201911205474.9, filed on Nov. 29, 2019, titled "CLEANING ROBOT", the contents of which are incorporated herein by reference.

TECHNICAL FIELD

The present disclosure relates to the field of intelligent robots, and particularly to a cleaning robot.

BACKGROUND

Cleaning robots are mainly used as a substitute of human beings for household cleaning, and integrate automatic cleaning technologies with human intelligence design. With the development of intelligent cleaning robots in the market, to meet the cleaning requirements and reduce the heavy tasks of sweeping and mopping of users, the intelligent cleaning robots have developed with multiple functions including vacuuming, sweeping, washing and mopping. Specifically, the bottom of the intelligent cleaning robots is equipped with a mop to wipe a to-be-cleaned surface, or the intelligent cleaning robots are equipped with a water tank to wet and clean a to-be-cleaned surface.

SUMMARY

An embodiment of the present disclosure provides a cleaning robot, including: a main body, a drive assembly and a cleaning assembly. The main body includes a bottom part. The drive assembly is configured to drive the cleaning robot to move on a to-be-cleaned surface. The cleaning assembly is configured to clean the to-be-cleaned surface. The cleaning assembly includes a mounting part, a wiping part and a release part. The mounting part is positioned on the bottom part of the main body. The mounting part includes a first rail, a second rail opposite to the first rail, and a first positioning part. The wiping part is positioned on the mounting part and includes a second positioning part corresponding to the first positioning part, the wiping part is movable from first ends of the first rail and the second rail to second ends of the first rail and the second rail until the second positioning part abuts against the first positioning part whereby the wiping part is fixed on the mounting part. The release part is positioned on the mounting part and configured to separate the second positioning part from the first positioning part whereby the wiping part is detached from the mounting part.

BRIEF DESCRIPTION OF THE DRAWINGS

To describe the embodiments of the present disclosure or the technical solutions in the related art more clearly, the following will give a brief introduction to the drawings associated with the embodiments of the present disclosure or the related art. It is obvious that the drawings in the following description are only intended to illustrate the present disclosure. For those skilled in the art, some deformations can be obtained according to these drawings without any creative work.

DETAILED DESCRIPTION

The technical solutions in the embodiments of the present disclosure will be described clearly below with reference to the drawings in the embodiments of the present disclosure. Obviously, the described embodiments are only a part of the embodiments of the present disclosure, and not exhaustive. Based on the embodiments of the present disclosure, all other embodiments obtained by one of ordinary skill in the art without creative work fall within the protection scope of the invention.

The direction words "front", "back", "left" and "right" in this disclosure are all based on the moving direction of the cleaning robot. The "top", "bottom", "up", "down", "horizontal" and "vertical" in this disclosure are based on the normal working state of the cleaning robot.

The following is an illustrative description where a cleaning robot is used to clean the domestic ground environment. In other embodiments, the cleaning robot can also clean other indoor or outdoor environments, such as restaurants, stations, airports.

Figure 1:
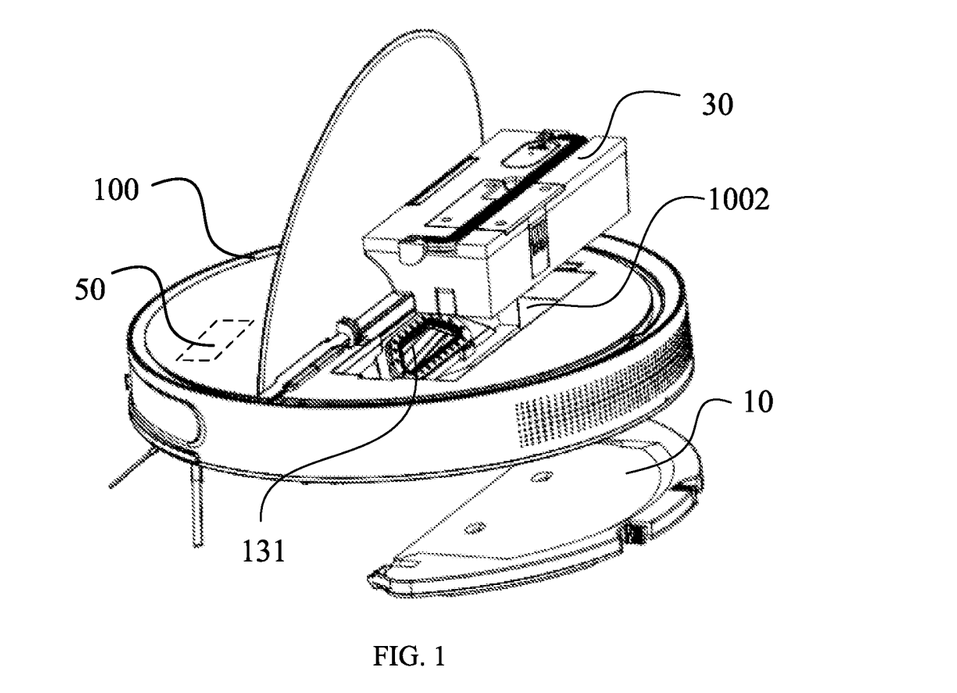
FIG. 1 is an isometric view of a cleaning robot according to an embodiment of the present disclosure.
Figure 2:
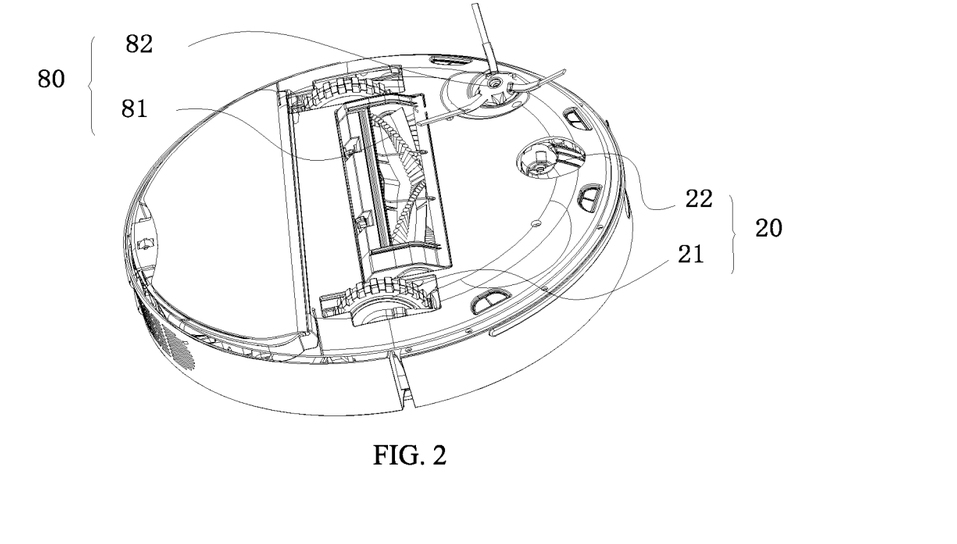
FIG. 2 is a schematic view of a bottom part of a cleaning robot according to an embodiment of the present disclosure.

Referring to FIGS. 1 and 2, FIG. 1 is an isometric view of a cleaning robot according to an embodiment of the present disclosure, and FIG. 2 is a schematic view of the bottom part of the cleaning robot. The cleaning robot includes a main body 100, a drive assembly 20 configured to drive the cleaning robot to move on a to-be-cleaned surface, and a cleaning assembly 10 configured to clean the to-be-cleaned surface. In the illustrated embodiments, the shape of the main body 100 is substantially circular, and in other embodiments, the shape of the body 100 may be elliptical, triangular, D-shaped or other shapes.

The drive assembly 20 includes left and right drive wheels 21 and an omnidirectional wheel 22. The left and right driving wheels 21 are positioned on the left and right sides of the bottom part of the main body 100. The bottom part refers to a surface of the main body 100 facing the to-be-cleaned surface. The drive assembly 20 is configured to support the cleaning robot and drive the cleaning robot to move on the to-be-cleaned surface. The to-be-cleaned surface can be a relatively smooth floor surface, a carpeted surface, and other surfaces that need to be cleaned. The left and right driving wheels 21 can partially stretch out and retract into the bottom part of the main body 100. The omnidirectional wheel 22 is mounted on the front end of the bottom part of the main body 100. The omnidirectional wheel 22 is a movable caster, which can rotate 360 degrees horizontally, such that the cleaning robot can turn flexibly. The connection lines of the left and right driving wheels 21 and the omnidirectional wheels 22 form a triangle, thus improving the walking stability of the cleaning robot.

The cleaning robot further includes a brush assembly 80 and a storage box 30. The brush assembly 80 includes a roller brush 81 and a side brush 82. The roller brush 81 is positioned in a first receiving groove defined on the bottom part of the main body 100. The bottom part of the main body 100 is sunken towards the top surface of the main body to form the first receiving groove. The main body 100 further defines a second receiving groove 1002. The first receiving groove and the second receiving groove 1002 communicate with each other via a suction inlet 131. The storage box 30 is positioned in the second receiving groove 1002. The storage box 30 includes a debris inlet communicating with the suction inlet 131. The roller brush 81 can be a hairbrush, glue brush, or a combination thereof. The roller brush 81 is rotatable around an axis substantially perpendicular to the moving direction of the cleaning robot under the drive of a drive motor positioned inside the main body. The side brush 82 is arranged at the left front part and/or the right front part of the main body 100. The side brush 82 is rotatable along an axis substantially perpendicular to the main body 100. The side brush 82 includes a plurality of long bristles arranged at intervals around the axis, and the long bristles extend outwards and go beyond the contour of the main body 100, so as to sweep the debris beyond the coverage range of the main body 100 on the ground into the position of the first receiving groove on the bottom of the main body 100. The roller brush 81 further sweeps the debris into the storage box 30. It can be understood that the cleaning robot, if otherwise excluding a roller brush 81, can include a dust suction pipe connected to the suction inlet 131, to clean the to-be-cleaned surface.

The cleaning robot can also include a controller 50 positioned on the main body 100. A plurality of controllers 50 can be provided to control different parts, respectively; or only one controller 50 is provided to control all the parts of the cleaning robot. For example, the controller 50 includes a main controller positioned on the main body 100, a drive assembly controller sensing the speed information of the driving part 20 and controlling the driving part 20 to adjust the operation of the cleaning robot, and the like. The controller of each part transmits its own information to the main controller. The main controller processes the information of each component and gives back the corresponding control instructions to each part. Each part takes the main controller as the center, communicates with each other and transmits signals. The controller 50 can be a microcontroller, field programmable gate array (FPGA), application specific integrated circuit (ASIC), digital signal processor (DSP) and other micro control units.

Figure 3:
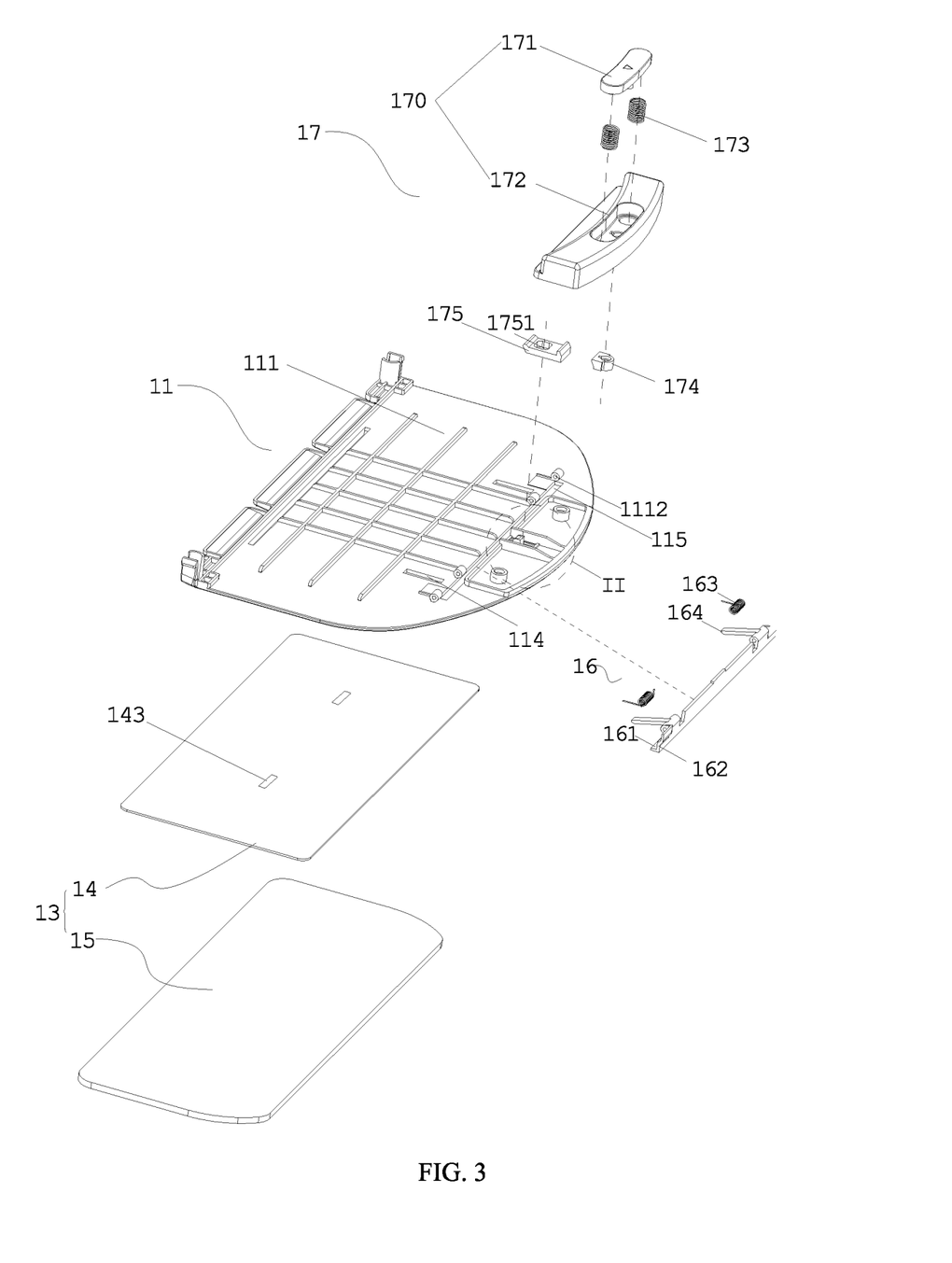
FIG. 3 is an exploded view of a cleaning assembly according to an embodiment of the present disclosure.
Figure 4:
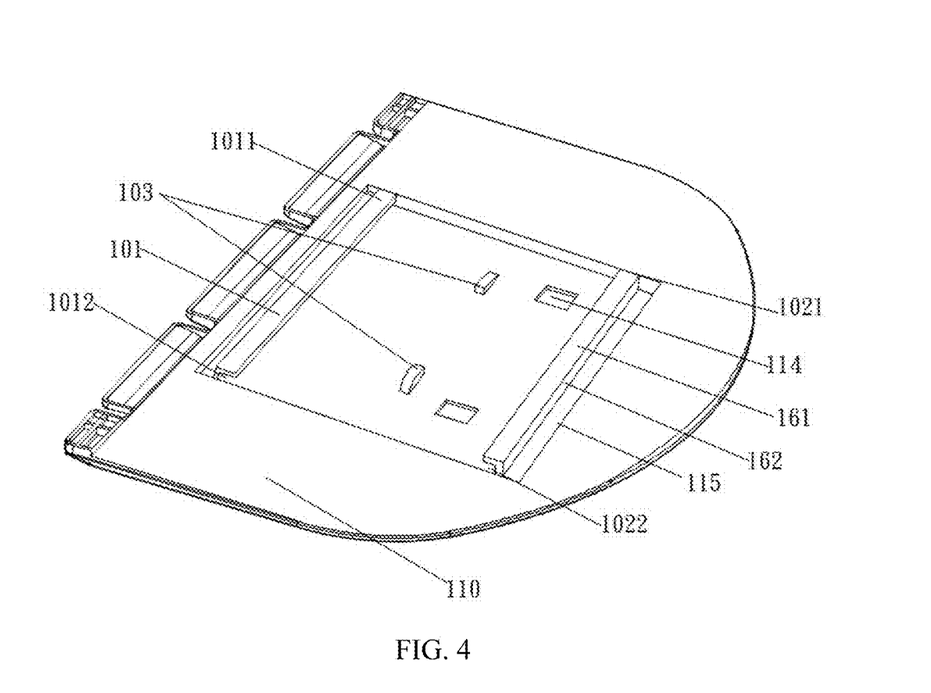
FIG. 4 is a schematic view of a mounting part according to an embodiment of the present disclosure.

Referring to FIGS. 3 and 4, FIG. 3 is an exploded view of the cleaning assembly according to an embodiment of the present disclosure, and FIG. 4 is a schematic view of a mounting part. In this illustrated embodiment, the cleaning assembly 10 is positioned on the rear part of the main body 100, and is configured to mop the to-be-cleaned surface after being cleaned by the brush assembly 80. In other embodiments, the cleaning assembly 10 can be mounted on the front or middle part of the main body 100, and the cleaning assembly 10 can independently clean the to-be-cleaned surface, or the cleaning assembly 10 can be arranged to cooperate with the brush assembly 80 to clean the to-be-cleaned surface. The mounting part 11 includes a male buckle, and the bottom part of the main body 100 includes a female buckle. When the male buckle is clamped in the female buckle, the mounting part 11 is secured to the bottom part of the main body 100. In other embodiments, the mounting part 11 can define a threaded hole, and the mounting part 11 is fixedly connected to the main body 100 through a screw. In some embodiments, the mounting part 11 can be integrately formed with the main body 100, thus becoming a part of the bottom part of the main body 100.

The cleaning assembly 10 includes the mounting part 11, and a wiping part 13 and a release part 16 both mounted on the mounting part 11. The mounting part 11 includes a first rail 101, a second rail 102 opposite to the first rail 101, and a first positioning part 103. The wiping part 13 includes a second positioning part 143 corresponding to the first positioning part 103 in shape and position. The wiping part 13 is movable from first ends of the first rail 101 and the second rail 102 to second ends thereof until the second positioning part 143 abuts against the first positioning part 103, whereby the wiping part 13 is fixed on the mounting part 11. The release part 16 is configured to separate the second positioning part 143 from the first positioning part 103, whereby the wiping part 13 is detached from the mounting part 11.

Figure 5:
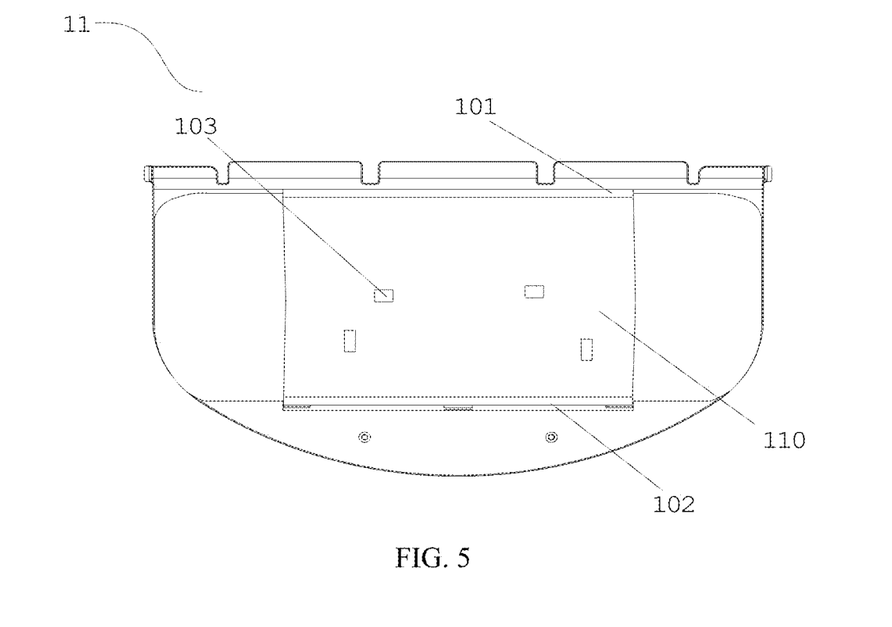
FIG. 5 is a planar view of a mounting part according to an embodiment of the present disclosure.
Figure 6:
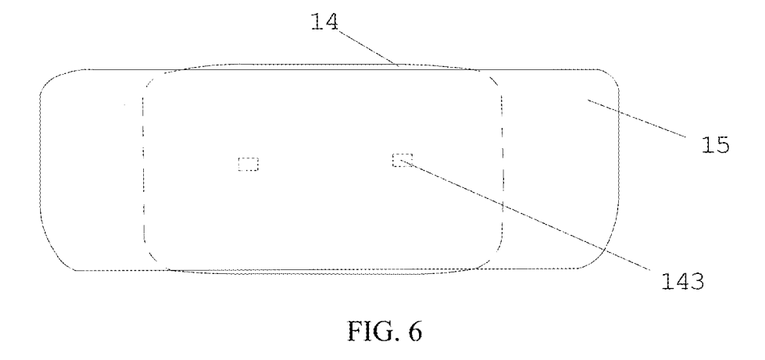
FIG. 6 is a schematic view of a wiping part according to an embodiment of the present disclosure.
Figure 7:
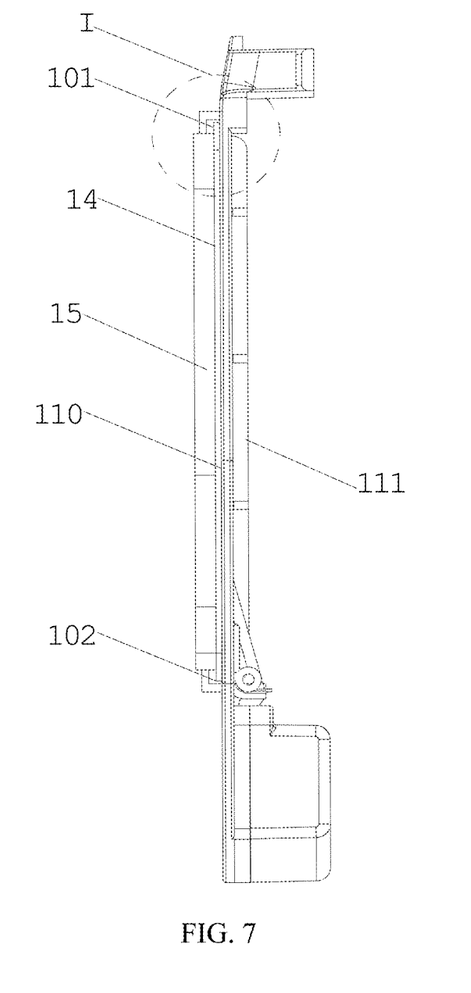
FIG. 7 is a side view of a cleaning assembly according to an embodiment of the present disclosure.
Figure 7A:
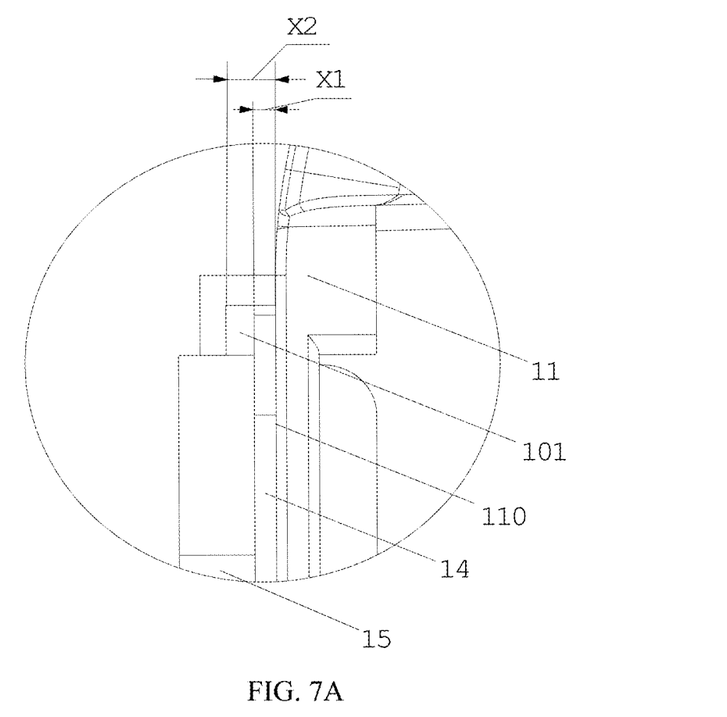
FIG. 7A is a partially enlarged view of part I in FIG. 7.

In this illustrated embodiment, the mounting part 11 is D-shaped, which can be mounted on the rear part of the substantially circular main body 100 of the cleaning robot, and the arc-shaped edge of the mounting part 11 corresponds to the arc-shaped edge of the main body 100. Referring to FIGS. 5-7, FIG. 5 is a planar view of the mounting part in an embodiment of the present disclosure;

FIG. 6 is a schematic view of the wiping part in an embodiment of the present disclosure; and FIG. 7 is a side view of the cleaning assembly in an embodiment of the present disclosure. The mounting part 11 includes a first surface 110 facing the wiping part 13, and a second surface 111 facing the main body 100. The wiping part 13 is mounted on the first surface 110. The wiping part 13 includes a mop cloth 15 and a mounting plate 14 connected to the mop cloth 15. The mop cloth 15 is connected to the mounting plate 14 through hook-and-loop fasteners, or the two are fixed and bonded with an adhesive, or the mop cloth 15 is sewn onto the mounting plate 14 with fine threads. The rigidity of the mounting plate 14 is greater than the rigidity of the mop cloth 15. The mop cloth 15 can be made of a mixture of cellulose and polymer fiber, such that the mop cloth 15 is water-absorbable, and the mounting plate 14 can be a thin plate made of cardboard or colloid material. Referring to FIG. 7A, which is a partially enlarged view of part I in FIG. 7. The thickness of the mounting plate 14 is X1, and the height of the first rail 101 is X2. The height X2 refers to the distance between the inner wall of the first rail 101 facing the first surface 110 and the first surface 110. The height of the second rail 102 is the same as that of the first rail 101, and X1 is smaller than X2, such that the mounting plate 14 can be inserted from the first ends of the first rail 101 and the second rail 102 and moves toward the second ends thereof. The mop cloth 15 surpasses the outer wall of the first rail 101.

In this illustrated embodiment, the first rail 101 and the second rail 102 are substantially perpendicular to the moving direction of the cleaning robot. A first end 1011 of the first rail 101 and a first end 1021 of the second rail 102 are close to the left side of the main body 100, and a second end 1012 of the first rail 101 and a second end 1022 of the second rail 102 are close to the right side of the main body 100. In this illustrated embodiment, the first positioning part 103 is a position protrusion protruding from the surface of the mounting part 11 facing the wiping part 13, and the second positioning part 143 is a positioning slot corresponding to the first positioning part 103 in shape and position. The first positioning part 103 protrudes from the first surface 110 of the mounting part 11 and is positioned between the first rail 101 and the second rail 102. The first positioning part 103 is tilted up from one end of the first rail 101 and/or the second rail 102 towards another end thereof. The wiping part 13 can be inserted from the first end 1011 of the first rail 101 and the first end 1021 of the second rail 102, and moves towards the second end 1012 of the first rail 101 and the second end 1022 of the second rail 102. Optionally, the wiping part 13 can be inserted from the second end 1012 of the first rail 101 and the second end 1022 of the second rail 102, and moves towards the first end 1011 of the first rail 101 and the first end 1021 of the second rail 102. The first positioning part 103 is tilted up from the first end 1011 of the first rail 101 towards the second end 1012 of the first rail 101, and the first positioning unit 103 may also be tilted up from the first end 1021 of the second rail 102 towards the second end 1022 of the second rail 102. In this way, the wiping part 13 can be inserted from the first end 1011 of the first rail 101 and the first end 1021 of the second rail 102, and move towards the second end 1012 of the first rail 101 and the second end 1022 of the second rail 102, thereby guiding the installation of the wiping part 13, and preventing the first positioning part 103 from hindering the installation of the wiping part 13. In other embodiments, the first positioning part 103 is tilted up from the second end 1012 of the first rail 101 towards the first end 1011 of the first rail 101, or tilted up from the second end 1022 of the second rail 102 towards the first end 1021 of the second rail 102, thus guiding the wiping part 13 to insert from the second end 1012 of the first rail 101 and the second end 1022 of the second rail 102, and to move towards the first end 1011 of the first rail 101 and the first end 1021 of the second rail 102, such that the wiping part 13 is mounted on the mounting part 11. In other embodiments, the configuration direction of the first rail 101 and the second rail 102 is the same as the moving direction of the cleaning robot, and the wiping part 13 is inserted from one end of the first rail 101 and the second rail 102 close to the rear end of the cleaning robot and moves towards the front end of the cleaning robot.

In some embodiments, the mounting part includes two of the first positioning parts 103; one of the first positioning parts 103 is tilted up from the first end 1011 of the first rail 101 towards the second end 1012 of the first rail 101, and the other of the first positioning parts 103 is tilted up from the second end 1012 of the first rail 101 towards the first end 1011 of the first rail 101; or, one of the first positioning parts 103 is tilted up from the first end 1021 of the second rail 102 towards the second end 1022 of the second rail 102, and the other of the first positioning parts 103 is tilted up from the second end 1022 of the second rail 102 towards the first end 1021 of the second rail 102; or, one of the first positioning parts 103 is tilted up from the first end 1011 of the first rail 101 and the first end 1021 of the second rail 102 towards the second end 1012 of the first rail 101 and the second end 1022 of the second rail 102. The wiping part 13 can be inserted from the first end 1011 of the first rail 101 and the first end 1021 of the second rail 102, and move toward the second end 1012 of the first rail 101 and the second end 1022 of the second rail 102 until the first positioning part 103 abuts against the second positioning part 143, thereby positioning the wiping part 13 on the mounting part 11.

Figure 8:
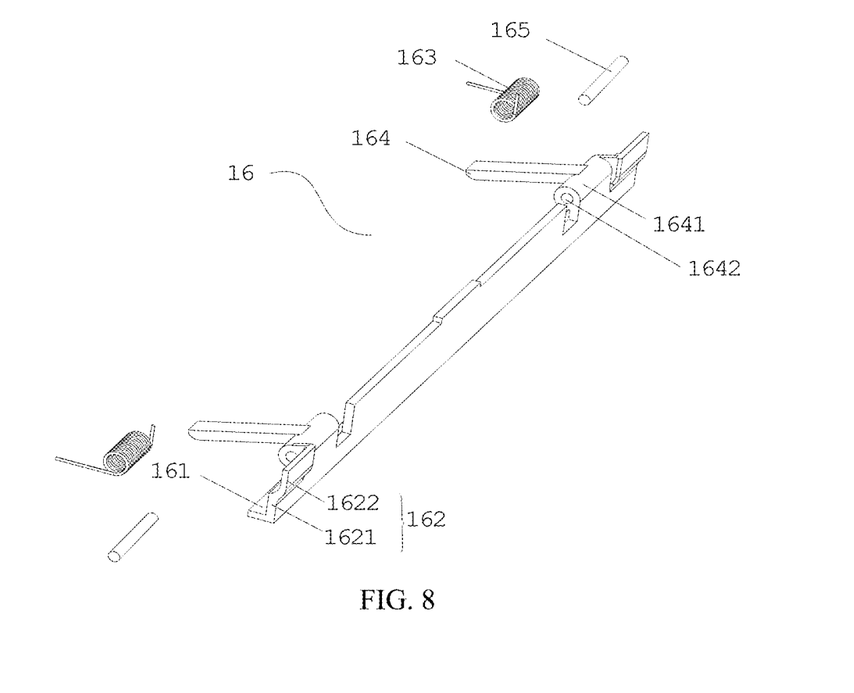
FIG. 8 is a schematic view of a release part according to an embodiment of the present disclosure.

Referring to FIG. 8, which is a schematic view of the release part according to an embodiment of the present disclosure. The release part 16 includes a first part 161 and a second part 162 substantially perpendicular to the first part 161. The second rail 102 is positioned between the first part 161 and the first surface 110 (see FIG. 4). The second part 162 includes a first securing part 1621 and a second securing part 1622 fixedly connected to the first securing part 1621. The second securing part 1622 defines an arc-shaped recess. The release part 16 further includes a first elastic member 163 and a pushing rod 164. The release part 16 is mounted on the mounting part 11 via the first elastic member 163, and the mounting part 11 defines a through hole 114 corresponding to the pushing rod 164 in position. When an external force is applied to the release part 16, the pushing rod 164 runs through the through hole 114 and sticks out of the first surface 110; when the external force is removed, the pushing rod 164 retracts into the through hole 114. In some embodiments, the first elastic member 163 can be a spring, a tension spring, a compression spring, etc., and corresponding installation structure exhibits corresponding deformation, such that other first elastic members have the same functions as the torsion spring of this illustrated embodiments.

Specifically, the mounting part 11 defines a channel 115 running through the first surface 110 and the second surface 111. The second part 162 of the release part 16 passes through the channel 115 and is mounted on the second surface 111 via the first elastic member, such that the second rail 102 is positioned between the first part 161 and the first surface 110. The pushing rod 164 is positioned in the arc-shaped recess of the second securing part 1622 via a support seat 1641. The support seat 1641 defines an axle hole 1642. The second surface 111 of the mounting part 11 defines a mounting hole 1112 corresponding to the axle hole 1642. A mounting shaft 165 is inserted into the axle hole 1642 to fix the release part 16 in the mounting hole 1112. The first elastic member 163 is a torsion spring, and the torsion spring is sleeved over the mounting shaft 165. The pushing rod 164 is inclined from the support seat 1641 towards the first securing part 1621. When the release part 16 is mounted on the mounting part 11, one end of the extended end of the torsion spring butts against the second securing part 1622, and the other end abuts against the second surface 111. The pushing rod 164 stays in the through hole 114 and does not stick out of the first surface 110. When an external force is applied to the release part 16, the release part 16 rotates around the mounting shaft 165, the torsion spring is squeezed, and the pushing rod 164 sticks out of the first surface 110. When the external force is removed, the torsion spring returns to the original position, and the pushing rod 164 retracts into the through hole 114. In other embodiments, it is the first rail 101 that is positioned between the first part 161 and the first surface 110. The release part 16 may be optionally mounted on a side of the mounting part 11, such that it is not necessary to define the channel 115 on the mounting part 11 to fix the release part 16.

In this illustrated embodiment, in mounting the wiping part 13, the mounting plate 14 of the wiping part 13 is inserted from one end of the first rail 101 and the second rail 102, and moves toward another end thereof until the second positioning part 143 abuts against the first positioning part 103, thereby positioning the wiping part 13 on the mounting part 11. In dismounting the wiping part 13, an external force is applied to the release part 16, and the release part 16 swings around the mounting shaft 165. The pushing rod 164 extends out of the first surface 110, such that the second positioning part 143 is separated from the first positioning part 103, and the wiping part 13 is ejected, whereby the wiping part 13 is detached from the mounting part 11. The first rail 101 or the second rail 102 is positioned between the first securing part 1621 and the first surface 110. When an external force is applied to the release part 16, the release part 16 rotates around the mounting shaft 165, and the wiping part 13 is released from the first rail 101 or the second rail 102, the pushing rod 164 sticks out of the first surface 110, to push the wiping part 13 off the mounting part 11. Thus, the user does not need to directly apply force on the wiping part 13 when replacing the wiping part 13, which makes the dismounting and mounting of the wiping part 13 convenient and sanitary, and improves the user experience.

Figure 9:
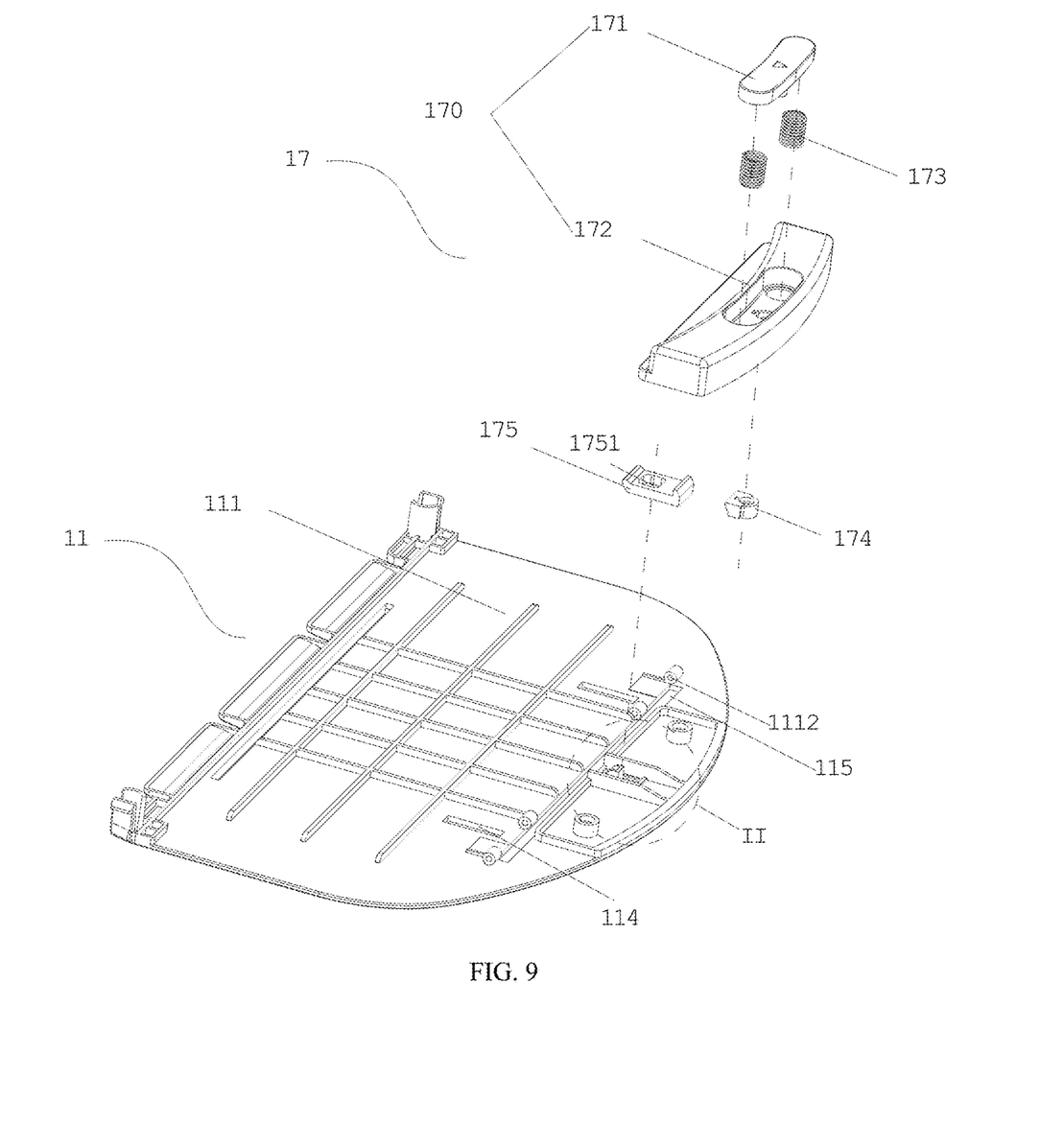
FIG. 9 is a disassembly view of a press module from a mounting part according to an embodiment of the present disclosure.
Figure 9A:
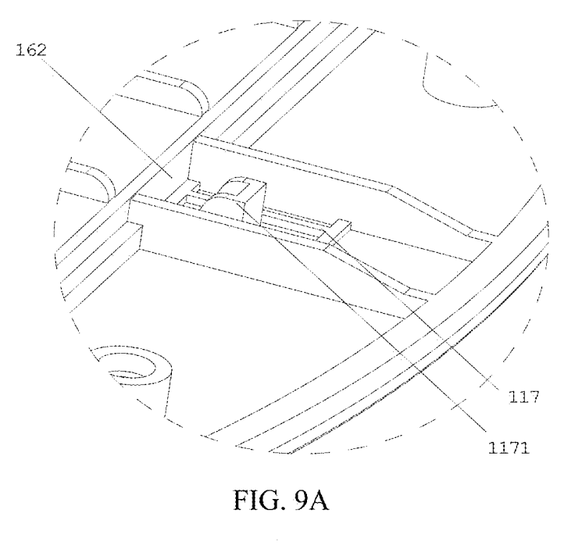
FIG. 9A is a partially enlarged view of part II in FIG. 9.

In some embodiments, referring to FIG. 9 and FIG. 9A, FIG. 9 is a disassembly view of a press module from the mounting part, and FIG. 9A is a partially enlarged view of Part II in FIG. 9. The cleaning assembly 10 further includes a press module 17, the press module 17 includes a press part 170, a second elastic member 173, and a transmission part 175; the transmission part 175 is mounted on the mounting part 11 and is connected to the release part 16; when an external force is applied to the press part 170, the external force is transmitted via the transmission part 175 to the release part 16, whereby the second positioning part 143 detaches from the first positioning part 103; when the external force is removed from the press part 170, the press part 170 restores its original position under the action of the second elastic member 173. Specifically, the second surface 111 of the mounting part 11 defines a mounting groove 117, and a positioning post 1171 is positioned in the mounting groove 117. The transmission part 175 defines a sliding channel 1751. The transmission part 175 is mounted in the mounting groove 117. The transmission part 175 is slidable in the mounting groove 117, and is limited by the positioning post 1171. The press part 170 includes a pressing body 172. The second elastic member 173 is mounted on the pressing body 172. A pressing part 171 is mounted on the pressing body 172. The pressing part 171 abuts against the second elastic member 173 and is mounted on the pressing body 172. A connection part 174 is positioned below the pressing body 172. The upper part of the connection part 174 is connected to the pressing part 171. The surface of the connection part 174 facing the transmission part 175 is an inclined plane, and the inclined direction of the inclined plane is toward the transmission part 175. The surface of the transmission part 175 opposite to the connection part 174 is an inclined plane having the same inclined direction as the connection part 174, and the second elastic member 173 is a spring. When an external force is applied to the pressing part 171, the spring is compressed, and the connection part 174 is forced downward to drive the transmission part 175 to slide towards the release part 16 in the mounting groove 117. The force is transmitted to the release part 16, such that the pushing rod 164 sticks out of the first surface 110 from the through hole 114, and the second positioning part 143 is separated from the first positioning part 103, whereby the wiping part 13 is detached from the mounting part 11. When the external force is removed from the pressing part 171, the spring returns to its original shape; the connection part 174 and the transmission part 175 return to the original position, and the pushing rod 164 retracts into the through hole 114.

Figure 10:
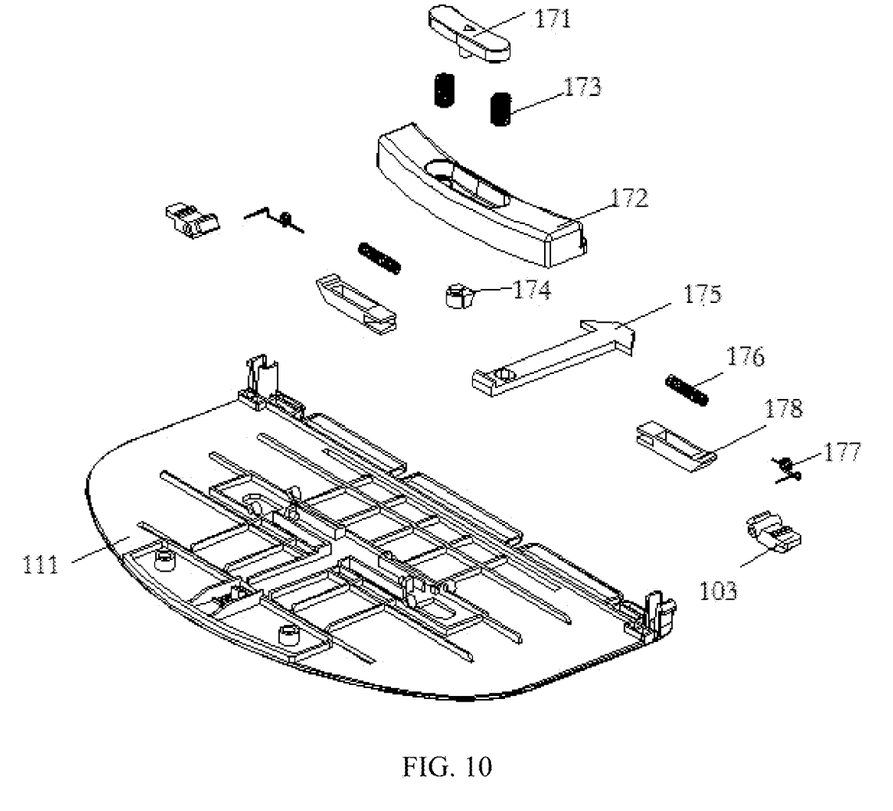
FIG. 10 is an exploded view of a cleaning assembly according to another embodiment of the present disclosure.

Referring to FIG. 10, FIG. 10 is an exploded view of a cleaning assembly of another embodiment of the present disclosure. In this illustrated embodiment of FIG. 10, the structure and function of the cleaning assembly 10 are basically the same as that of the cleaning assembly 10 in the preceding embodiments, except that: the release part 16 does not include the pushing rod, and the release part 16 is connected to the first positioning part 103. The installation position of the first positioning part 103 corresponds to the through hole 114. When no external force is exerted on the release part 16, the first positioning part 103 runs through the through hole 114 and sticks out of the first surface 110. When an external force is exerted on the release part 16, and the first positioning part 103 retracts into the mounting part 11. Specifically, the first positioning part 103 includes an extension end and a mounting end; the extension end extends from the through hole 114 and sticks out of the first surface 110. The mounting end is mounted on the second surface 111 through a third elastic member 177, which is a torsion spring. When an external force is applied to the pressing part 171, the transmission part 175 can slide forward. The front end of the transmission part 175 is provided with left and right transmission parts 178. The left transmission part and the right transmission part are positioned on the left and right sides of the front end of the transmission part 175, respectively, which can slide in the left and right directions. The left and right transmission parts 178 each include a fourth elastic member 176, which is a spring. One end of the left and right transmission parts 178 is connected to the front end of the transmission part 175, and the other end is connected to the mounting end of the first positioning part 103. The left and right transmission parts 178 are connected to the front end of the transmission part 175 and the mounting end of the first positioning part 103 by inclined planes.

In assembling the wiping part 13, the first positioning part 103 sticks out of the first surface 110. The mounting plate 14 of the wiping part 13 is inserted from the one end of the first rail 101 and the second rail 102, and moves toward another end thereof until the second positioning part 143 abuts against the first positioning part 103, thereby positioning the wiping part 13 on the mounting part 11. In dismounting the wiping part 13, an external force is applied to the pressing part 171, and the second elastic member 173 is compressed. The connection part 174 is forced downward to push the transmission part 175 to slide forward in the sliding channel 1751. The transmission part 175 pushes the left and right transmission parts 178 to slide to the left and right respectively, and the fourth elastic member 176 installed in the left and right transmission parts 178 is compressed. The force is transmitted to the mounting end of the first positioning part 103, such that the extension end of the first positioning part 103 retracts into the through hole 114, and the second positioning part 143 is separated from the first positioning part 103, whereby the wiping part 13 is detached from the mounting part 11. When the external force is removed from the pressing part 171, all of the connection part 174, the transmission part 175, the left and right transmission parts 178 and the first positioning part 103 return to the original position, and the extension end of the first positioning part 103 sticks out of the first surface 110.

In the illustrated embodiment, the first positioning part 103 is connected to the release part 16, and when an external force is applied to the press module 17, the first positioning part 103 is retracted into the through hole 114, such that the second positioning part 143 is separated from the first positioning part 103, and the wiping part 13 is removed from the mounting part 11. This brings more convenient to replace the wiping part 13 and enhances the user experience.

In some embodiments, the second positioning part 143 is a protrusion protruding from the surface of the wiping part 13 facing the mounting part 11, and the first positioning part 103 is a positioning slot corresponding to the second positioning part 143 in shape and position; and the second positioning part 143 is tilted up from one end of the first rail 101 and/or the second rail 102 to another end thereof.

In the embodiments of the present disclosure, the cleaning robot includes the main body 100, the drive assembly 20 configured to drive the cleaning robot to move on a to-be-cleaned surface, and the cleaning assembly 10 configured to clean the to-be-cleaned surface. The cleaning assembly 10 includes the mounting part 11, the wiping part 13 positioned on the mounting part 11, and the release part 16. The mounting part 11 includes the first rail 101, the second rail 102 opposite to the first rail 101, and the first positioning part 103. The wiping part 13 includes the second positioning part 143 corresponding to the first positioning part 103; the wiping part 13 is movable from the first ends of the first rail 101 and the second rail 102 to the second ends of the first rail 101 and the second rail 102 until the second positioning part 143 abuts against the first positioning part 103, whereby the wiping part 13 is fixed on the mounting part 11. The release part 16 includes the pushing rod 164 configured to eject the wiping part 13 or the first positioning part retracts into the mounting part, thus separating the second positioning part 143 from the first positioning part 103, whereby the wiping part 13 is detached from the mounting part 11. Thus, the user does not need to directly apply a force on the mop cloth 15 when replacing the wiping part 13, which makes the dismounting and mounting of the wiping part convenient and sanitary, and improves the user experience.

In the description of this specification, the reference term "an embodiment," "some embodiments," "examples," "specific examples," or "an optional embodiment" and the like means that specific features, structures, materials, or features described in connection with the embodiments or examples are included in at least an embodiment or example of the present disclosure. In this specification, a schematic description of the above terms does not necessarily refer to the same embodiment or example. Moreover, the specific features, structures, materials or features described may be combined in an appropriate manner in any one or more embodiments or examples.

The above-described embodiments do not constitute a limitation on the protection scope of the technical solution. Any modification, equivalent replacement and improvement made within the spirit and principle of the above embodiments shall be included in the protection scope of the technical solution.

What is claimed is:

1. A cleaning robot, comprising:
a main body comprising a bottom part;
a drive assembly, configured to drive the cleaning robot to move on a to-be-cleaned surface; and
a cleaning assembly, configured to clean the to-be-cleaned surface, the cleaning assembly comprising:
a mounting part positioned on the bottom part of the main body, the mounting part comprising a first rail, a second rail opposite to the first rail, and a first positioning part;
a wiping part positioned on the mounting part and comprising a second positioning part corresponding to the first positioning part, wherein, the wiping part is movable from first ends of the first rail and the second rail to second ends of the first rail and the second rail until the second positioning part abuts against the first positioning part whereby the wiping part is fixed on the mounting part; and
a release part positioned on the mounting part and configured to separate the second positioning part from the first positioning part whereby the wiping part is detached from the mounting part;
wherein the cleaning assembly further comprises a press module; the press module comprises a press part, a second elastic member, and a transmission part;
the transmission part is positioned on the mounting part and is connected to the release part; when an external force is applied to the press part, the external force is transmitted via the transmission part to the release part, whereby the second positioning part detaches from the first positioning part; when the external force is removed, the press part restores an original position thereof under the action of the second elastic member;
the mounting part defines a mounting groove, the mounting part further comprises a positioning post positioned in the mounting groove;
the transmission part defines a sliding channel, the transmission part is mounted in the mounting groove, the positioning post passes through the sliding channel, and the transmission part is slidable in the mounting groove and is limited by the positioning post.

2. The cleaning robot of claim 1, wherein the release part comprises a first part and a second part substantially perpendicular to the first part; and the second part is substantially perpendicular to a first surface of the mounting part facing the wiping part.

3. The cleaning robot of claim 2, wherein the first rail or the second rail is formed between the first part and the first surface of the mounting part facing the wiping part.

4. The cleaning robot of claim 2, wherein the release part further comprises a first elastic member; and the release part is secured to the mounting part via the first elastic member.

5. The cleaning robot of claim 4, wherein the mounting part further comprises a second surface opposite to the first surface, the mounting part defines a channel running through the first surface and the second surface;
the second part passes through the channel and is mounted on the second surface via the first elastic member.

6. The cleaning robot of claim 4, wherein the mounting part further defines a through hole; the release part further comprises a pushing rod corresponding to the through hole; when an external force is applied to the release part, the pushing rod sticks out of the first surface of the mounting part facing the wiping part; and when the external force is removed, the pushing rod retracts into the through hole.

7. The cleaning robot of claim 6, wherein the release part further comprises a support seat and a mounting shaft;
the pushing rod is positioned on the second part via the support seat;
the support seat defines an axle hole, the second surface defines a mounting hole corresponding to the axle hole, the mounting shaft is inserted into the axle hole and the mounting hole to fix the release part to the mounting part.

8. The cleaning robot of claim 7, wherein the second part comprises a first securing part and a second securing part connected to the first securing part;
the support seat is positioned on the second securing part;
the pushing rod is inclined from the support seat towards the first securing part.

9. The cleaning robot of claim 8, wherein the second securing part defines an arc-shaped recess;
an end of the pushing rod is positioned in the arc-shaped recess via the support seat.

10. The cleaning robot of claim 8, wherein the first elastic member is a torsion spring, the torsion spring is sleeved over the mounting shaft;

one end of the torsion spring butts against the second securing part, and the other end of the torsion spring abuts against the second surface.

11. The cleaning robot of claim 1, wherein the wiping part further comprises a mop cloth and a mounting plate connected to the mop cloth, and a rigidity of the mounting plate is greater than a rigidity of the mop cloth.

12. The cleaning robot of claim 11, wherein a thickness of the mounting plate is X1, a height of the first rail is X2, and X1 is smaller than X2, such that the mounting plate is capable of being inserted from first ends of the first rail and the second rail and moves toward second ends of the first rail and the second rail;
the mop cloth surpasses an outer wall of the first rail.

13. The cleaning robot of claim 1, wherein the first rail and the second rail are substantially perpendicular to the moving direction of the cleaning robot.

14. The cleaning robot of claim 1, wherein the press module further comprises a pressing body and a connection part;
the second elastic member is mounted on the pressing body;
the pressing part is mounted on the pressing body, the pressing part abuts against the second elastic member;
the connection part is positioned below the pressing body, an upper part of the connection part is connected to the pressing part, a surface of the connection part facing the transmission part is a first inclined plane;
a surface of the transmission part facing the connection part is a second inclined plane, the second inclined plane having the same inclined direction as the first inclined plane.

15. The cleaning robot of claim 1, wherein the first positioning part is a protrusion protruding from a surface of the mounting part facing the wiping part, and the second positioning part is a positioning slot corresponding to the first positioning part.

16. The cleaning robot of claim 15, wherein the first positioning part is positioned between the first rail and the second rail; and the first positioning part is tilted up from one end of the first rail and/or the second rail towards another end thereof.

17. The cleaning robot of claim 15, wherein the release part is connected to the first positioning part; when an external force is applied to the release part, the first positioning part retracts into the mounting part.

18. The cleaning robot of claim 1, wherein the second positioning part is a protrusion protruding from a surface of the wiping part facing the mounting part, and the first positioning part is a positioning slot corresponding to the second positioning part; and the second positioning part is tilted up from one end of the first rail and/or the second rail to another end thereof.

19. A cleaning robot, comprising:
a main body comprising a bottom part;
a drive assembly, configured to drive the cleaning robot to move on a to-be-cleaned surface; and
a cleaning assembly, configured to clean the to-be-cleaned surface, the cleaning assembly comprising:
a mounting part positioned on the bottom part of the main body, the mounting part comprising a first rail, a second rail opposite to the first rail, and a first positioning part;
a wiping part positioned on the mounting part and comprising a second positioning part corresponding to the first positioning part, wherein, the wiping part is movable from first ends of the first rail and the second rail to second ends of the first rail and the second rail until the second positioning part abuts against the first positioning part whereby the wiping part is fixed on the mounting part; and
a release part positioned on the mounting part and configured to separate the second positioning part from the first positioning part whereby the wiping part is detached from the mounting part;
wherein the cleaning assembly further comprises a press module; the press module comprises a press part, a second elastic member, and a transmission part;
the transmission part is positioned on the mounting part and is connected to the release part; when an external force is applied to the press part, the external force is transmitted via the transmission part to the release part, whereby the second positioning part detaches from the first positioning part; when the external force is removed, the press part restores an original position thereof under the action of the second elastic member;
the press module further comprises a pressing body and a connection part;
the second elastic member is mounted on the pressing body;
the pressing part is mounted on the pressing body, the pressing part abuts against the second elastic member;
the connection part is positioned below the pressing body, an upper part of the connection part is connected to the pressing part, a surface of the connection part facing the transmission part is a first inclined plane;
a surface of the transmission part facing the connection part is a second inclined plane, the second inclined plane having the same inclined direction as the first inclined plane.

* * * * *